Feb. 27, 1962  A. T. BLAKE  3,022,959
SELF-LOCKING CORE CHUCKS
Filed Oct. 14, 1957  5 Sheets-Sheet 1

INVENTOR.
ARTHUR T. BLAKE
BY *Eric E. Franke*

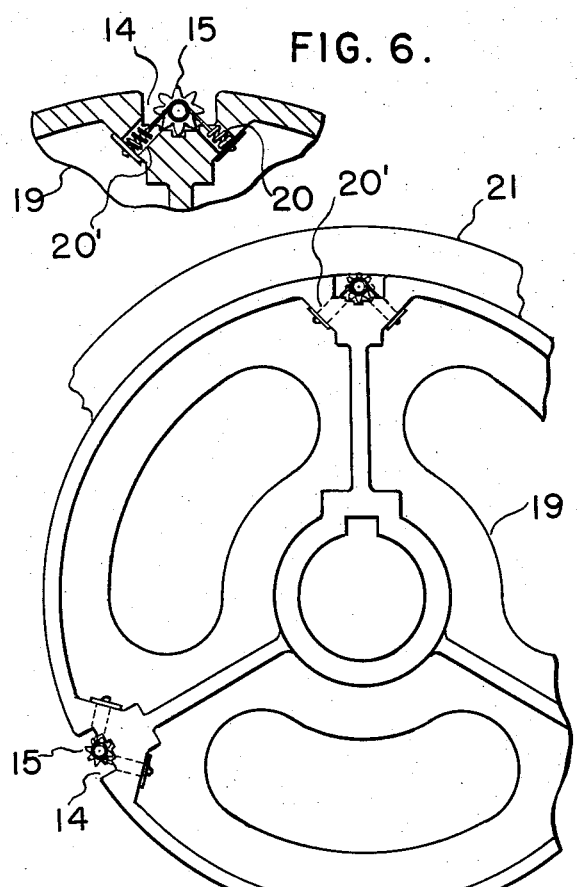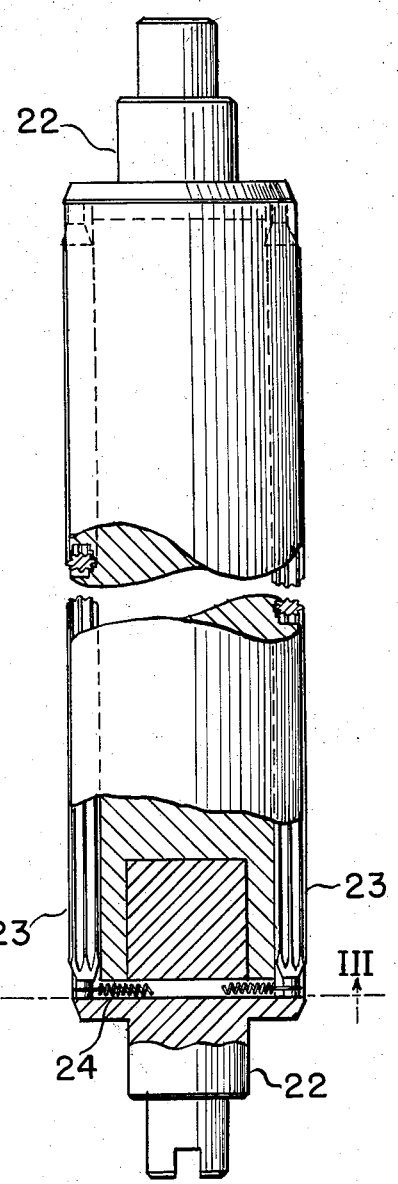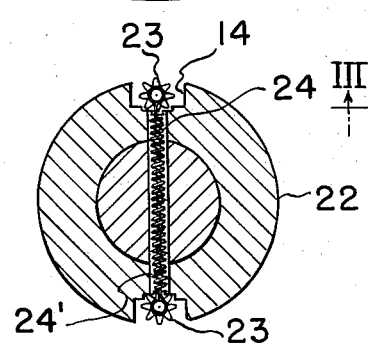

*INVENTOR.*
ARTHUR T. BLAKE
BY *Erin E. Franke*

United States Patent Office 3,022,959
Patented Feb. 27, 1962

3,022,959
SELF-LOCKING CORE CHUCKS
Arthur T. Blake, 57 Ilford Ave., North Arlington, N.J.
Filed Oct. 14, 1957, Ser. No. 690,062
10 Claims. (Cl. 242—72)

The present invention relates to self-locking and self-adjusting core chucks for winding and unwinding rolls of various materials such as webs, films or foils which, while being processed or used, are wound into, or unwound from, rolls having a hollow, cylindrical core, usually made of cardboard. In handling such materials, a spindle or shaft is passed through the core and so-called core chucks are employed to lock the core to the spindle or shaft.

In general, the efficiency of these core chucks is determined by their ability to lock and hold a cardboard core to the shaft of the respective processing machines. However, increasing attention has been given lately to additional factors, such as how readily the core chuck can be inserted, whether or not it exerts a locking effect in either direction of rotation of the shaft and how easily it can be disengaged and removed in order to take the roll or core off the shaft. Thus, core chucks that must be driven into place by means of a sledge hammer, which entails considerable effort and skill since an uneven insertion of the chuck causes spoilage and delay, have been replaced to some extent by chucks that are expanded within the core by means of wrenches or levers. Nevertheless, the amount of force necessary to secure the chuck firmly is still subject to the judgment of the operator which, thus, determines the efficiency of the chuck as a locking means.

It is, therefore, the principal object of the present invention to provide a self-adjusting core chuck that becomes locked as a result of the tensional pull of the material that is wound or unwound by the process machine, whereby the locking power of the chuck increases in a direct ratio with the increase in the tensional pull of the material.

It is another object of the present invention to provide a core chuck that will lock a roll core firmly to a spindle or shaft without the intervention of human force or skill.

It is still another object of the present invention to provide a core chuck that not only functions equally well in either direction of rotatory pull, but may be readily disengaged and removed at any stage of the winding or unwinding operation.

With these and other objects in view which will become apparent in the following detailed description, the present invention will be clearly understood in connection with the accompanying drawings, in which:

FIG. 5 is a front elevation of another embodiment of the present invention;

FIG. 6 is an enlarged, sectional view of a part of the embodiment shown in FIG. 5;

FIG. 7 is a partly sectional side elevation of still another embodiment of the present invention;

FIG. 8 is a sectional view along the lines III—III of FIG. 7;

Figure 1:
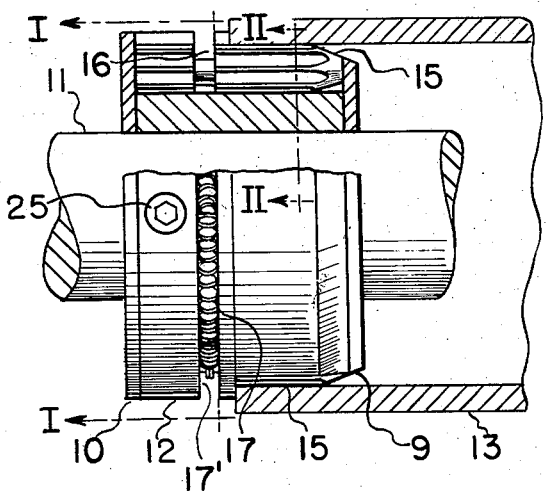
FIGURE 1 is a partly sectional side view of the herein-claimed device.
Figure 2:
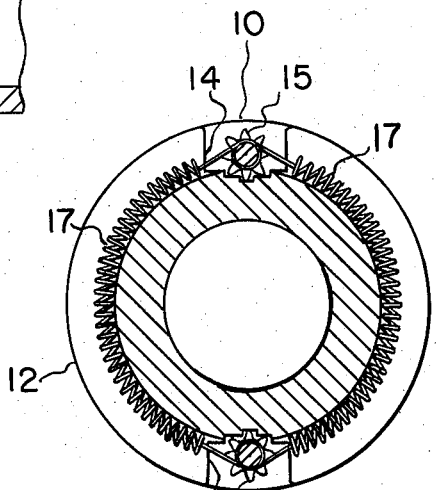
FIG. 2 is a sectional view along the lines I—I of FIG. 1.

Referring in more detail to the drawings, FIG. 1 illustrates a mandrel shaft 11 inserted into a core 13 which may be, for example, one of the cardboard cores used for the winding and unwinding of rolls of various materials. Two core chucks of proper size are fastened to the shaft, one at each end of the core. The core chucks consist of hollow, cylindrical bodies 12 which, as shown, are machined down at one end to short, truncated cones in order to facilitate insertion of the chucks into the core, up to a rear shoulder of somewhat larger diameter. As illustrated in FIG. 2, one or more, but preferably two, opposite, peripheral and coaxial recesses 14 are cut longitudinally into the chuck body, whereby the bottom of each recess is terraced in form of opposite stairs descending toward a common bottom groove. Inserted into these recesses are the toothed rollers 15 which, preferably, are of the same length as the chuck body, to fit closely, but freely rotatably, between the front retainer ring 9 and the rear retainer ring 10. As shown in FIG. 1, the rollers 15 are preferably provided with truncated conical ends to fit peripherally flush against the edge of the front retainer ring 9 if unengaged. Moreover, the rollers 15 are provided with neck journals 16, for the purpose of retaining the ends of helical springs 17, held within a groove 17' cut into the surface of the chuck body perpendicularly to its axis. By means of a set screw 25, the core chuck is locked to the mandrel shaft.

Figure 3:
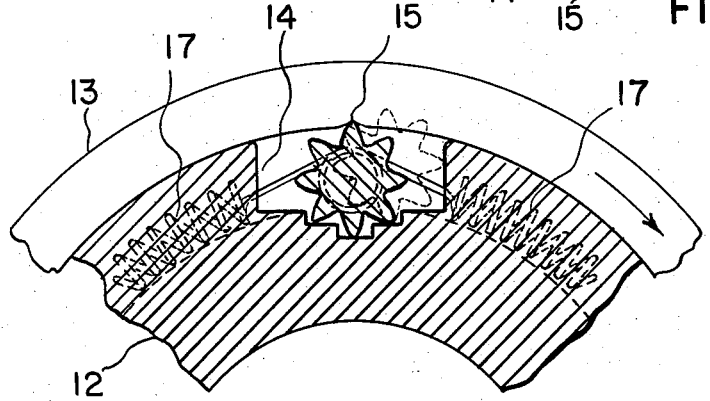
FIG. 3 is an enlarged partial sectional view along the lines II—II of FIG. 1.

As shown in the enlarged sectional view of FIG. 3, the diameter of the toothed roller 15 is selected to slightly exceed the greatest depth of the peripheral recess 14. Consequently, when the roller 15, held by the springs 17, is at rest with one of the teeth positioned within the center groove of the recess, the uppermost tooth of the roller just about projects beyond the periphery of the chuck body and only a relatively light effort is needed to insert the chuck within the core 13. Most of this light effort is expended to produce an intimate contact between the rim of this tooth and the inside surface of the core 13. In other words, the uppermost tooth of the roller should dig slightly into the cardboard core 13 upon insertion of the chuck or make at least sufficient contact with the core to be forced along by any rotational movement of the core with respect to the mandrel and the core chuck. This being the case, the roller 15 which, held by the springs 17, hitherto rested with its lowermost tooth against the bottom groove of the recess 14, is forced into ascending the stairs in the direction of the rotary movement of the core; or is forced to mount the stairs in the opposite direction of the rotary movement of the mandrel, depending whether the rotational movement originates with the core 13 or with the mandrel 11. As a result, the uppermost tooth of the roller 15 digs into the core 13 to the extent of ascent upon the stairs and a substantially unbreakable contact between the core 13 and the mandrel 11 is produced, permitting winding and unwinding operations at high speed and in the presence of heavy rotatory pull on the part of the mandrel 11 or lateral pull of the same order exerted upon the web.

It is, however, a particular advantage of the present invention that this intimate contact between the core 13 and the mandrel 11 can be broken the moment the winding or unwinding operation comes to a standstill. A slight rotational movement of either the core 13 or the mandrel 11 in the opposite direction causes the toothed roller 15 to descend into its rest position within the bottom groove. This movement is aided by one of the two springs which, up to this moment, had been under increased tension.

Since the toothed rollers 15 are retained within peripheral recesses of the chuck body which are terraced in the form of opposite stairs, it is evident that, upon using chucks of the present invention, a winding operation can be immediately followed by an unwinding operation, or vice versa, without the necessity of reversing the chucks.

Figure 4:
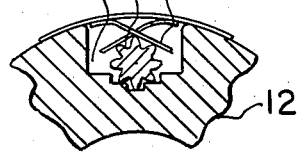
FIG. 4 is a partial, sectional view of a slightly different embodiment of the present invention.

Having described the principle of the herein-claimed invention by referring particularly to FIGS. 1, 2 and 3, a slightly different embodiment is shown in FIG. 4, wherein the previously mentioned tension springs are replaced by flat leaf springs 18, fastened to the rear shoulder of the chuck body and pressing against the toothed roller 15 so as to retain the latter in its lowermost position until, upon insertion of a mandrel 11 carrying the chuck into a core 13 and a slight rotational dislocation of the chuck with respect to the core, the roller 15, in frictional contact with the core, mounts the stairs at one side of the recess 14 and causes the intimate connection between the core 13 and the mandrel 11 previously described. Obviously, the use of such leaf springs eliminates the necessity of providing a groove, such as the peripheral groove 17′ for retaining the tension springs.

FIGS. 5 and 6 show a core chuck 19 of the present invention that is particularly adapted for use in conjunction with oversize cores, such as the core 21. In order to eliminate excess weight, the chuck is preferably built, as shown, in the form of a spider wheel with substantially triangular heads at the peripheral ends of the spider arms. These heads are provided with terraced recesses 14 and toothed rollers 15 as previously described. As shown in detail in FIG. 6, each spider head comprises short tension springs 20 mounted within lateral borings 20′ to hold the toothed rollers 15 within the center of the recesses 14 when at rest. FIG. 5 depicts a spider core chuck with three arms, but the number of arms can be decreased to two or increased to four or more.

While the afore-described embodiments constitute core chucks providing an intimate connection between core extremities and a mandrel shaft of smaller diameter inserted into the core, FIGS. 7 and 8 illustrate a self-locking wind-up mandrel 22 which, according to the principle of the present invention, eliminates the necessity of separate core chucks. The mandrel, provided with, say, two opposite, full length toothed rollers 23, is dimensioned to fit closely into a core. Since the uppermost teeth of the rollers 23 extend slightly beyond the perimeter of the mandrel 22, these teeth cut slightly into the inner core surface upon insertion of the mandrel and, upon a rotary movement of either core or mandrel with respect to the other, produce a substantially unbreakable, full length connection between the two. FIG. 8 illustrates in detail the manner of retaining the opposite rollers 23 at rest position within the recesses 14 by means of one common tension spring 24, held within the diametrical boring 24′ of the mandrel.

Figure 12:
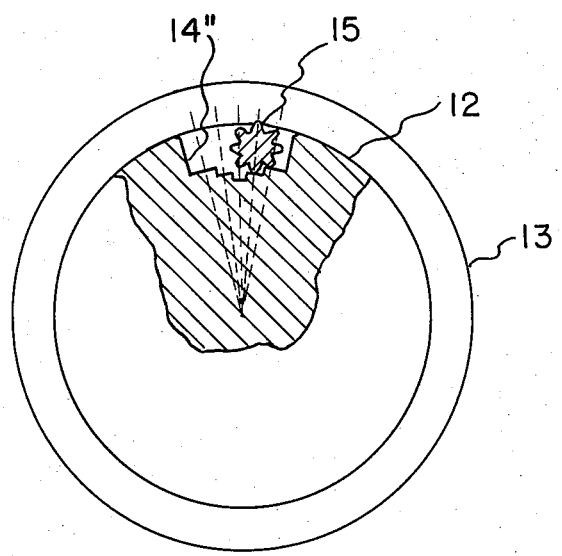
FIGS. 12 and 13 are front elevations, partly in section, of still further embodiments of the present invention.

According to the variant shown in FIG. 12, the side walls as well as the risers of the terraced bottom of the recess 14″ are cut diametrically into the chuck body, while the terraces are inclined to provide surfaces substantially parallel to the cylindrical core surface.

Figure 13:
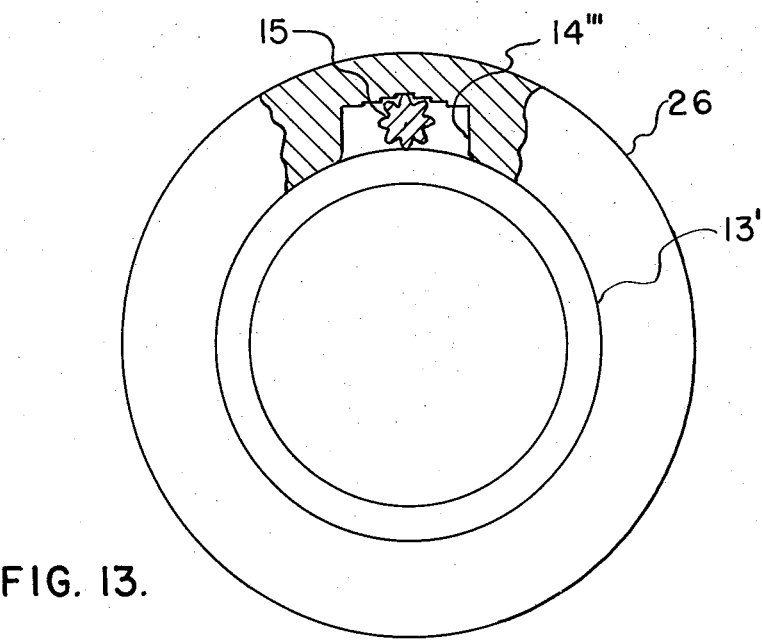

The core chuck shown in FIG. 13 is particularly adapted for use in conjunction with hollow cores of very small diameter or full cores such as cylindrical rods from wood or metal. In either case, end sections of the core 13′ must project at both sides beyond the edge of the roll to fit the core chucks over these end sections. The recess 14‴ is machined into the inner surface of the chuck body 26 so that, while the roller 15 is held in the usual manner in a position resting against the bottom groove, one of its teeth projects slightly beyond the inside circumference of the chuck. The chuck may be either secured to a shaft sufficiently small in diameter to fit one of the aforementioned small diameter hollow cores or, in the case of a full core, chucks may be attached to, or form parts of, opposite shaft journals in lieu of a continuous shaft. These journals may be hollowed over part of their length to accommodate longer end sections of such full cores.

Figure 15:
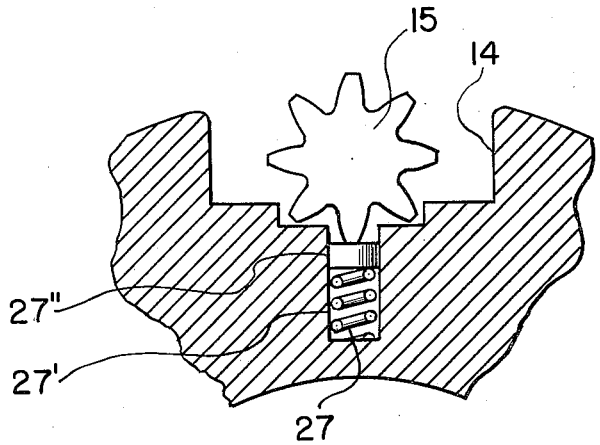
FIG. 15 is a partly sectional front elevation of another embodiment of the present invention.

FIG. 15 illustrates an embodiment which, generally, is identical with that shown in FIG. 3, except that the bottom groove 27′ of the peripheral recess 14 is sufficiently deepened to retain a series of springs such as the spring 27 and the platform 27″, reciprocally actuated by the springs. The number of springs depends upon the length of the toothed roller 15, their strength and the relative distance at which they are located from each other. This embodiment is particularly adapted for causing the required intimate contact between the toothed roller 15 and a core, without the necessity of providing a roller whose over-all diameter exceeds the greatest depth of the peripheral recess. While the springs 17 (see FIG. 3) tend to retain the roller 15 in the center of recess 14, the springs 27 press the roller upward and against the core. On the other hand, the pressure of the springs 27 is readily overcome when the chuck is being inserted into the core.

Figure 9:
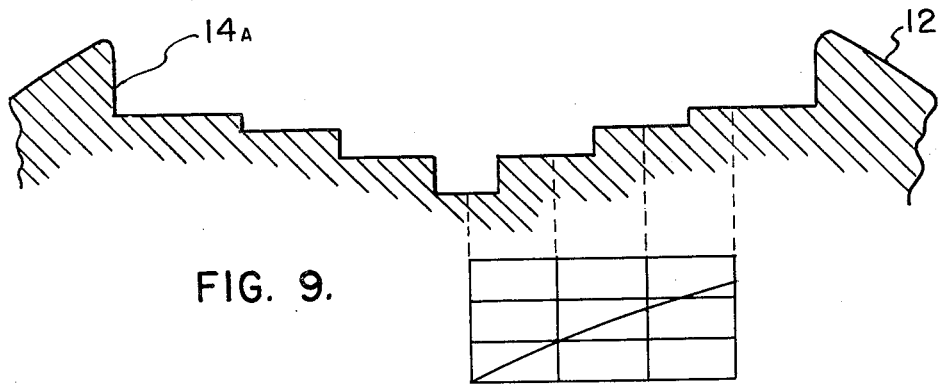
FIGS. 9, 10 and 11 are diagrammatic views demonstrating the principle of the present invention.
Figure 10:
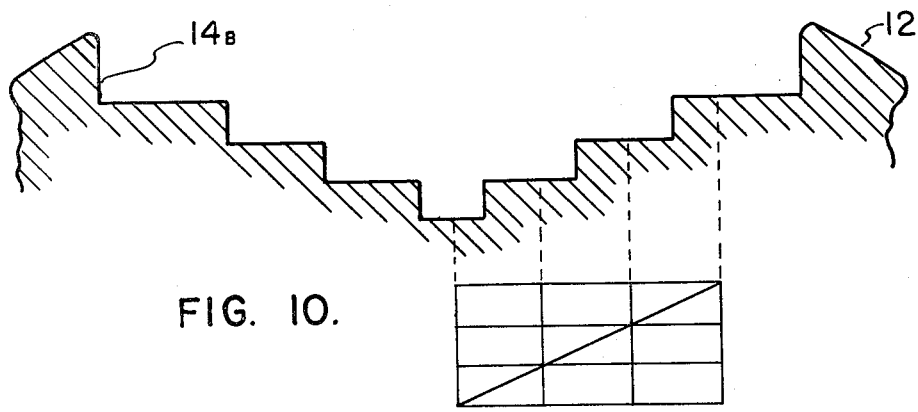
Figure 11:
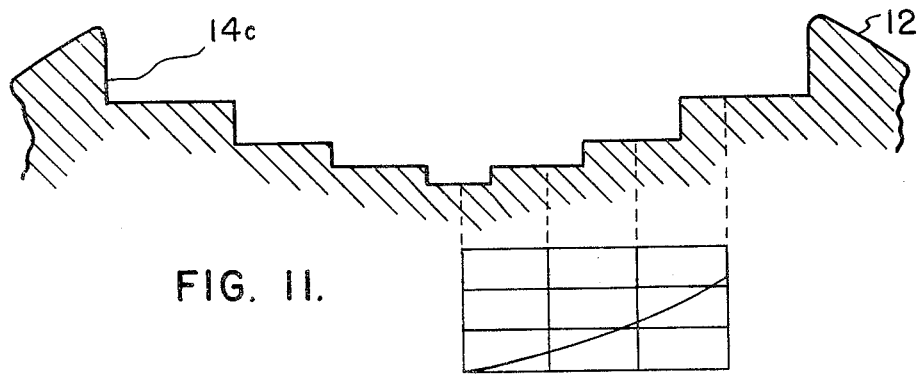

FIGS. 9, 10 and 11, if considered, preferably, in conjunction with FIG. 3, illustrate how the shape of the terracing of the recess determines acuteness and degree of issue of the toothed roller beyond the periphery of the chuck body upon the rotating effect of a core. FIG. 3, for example, shows a typical roller, provided with eight teeth. Although the number of teeth may be larger or smaller, the roller is preferably equipped with an even number of teeth so that, while the roller rests with the lowermost tooth against the bottom groove of the recess, or after having ascended one or several steps of the terraced bottom, the highest tooth will point straight up and, consequently, bite as deeply as possible into the core.

Figure 14:
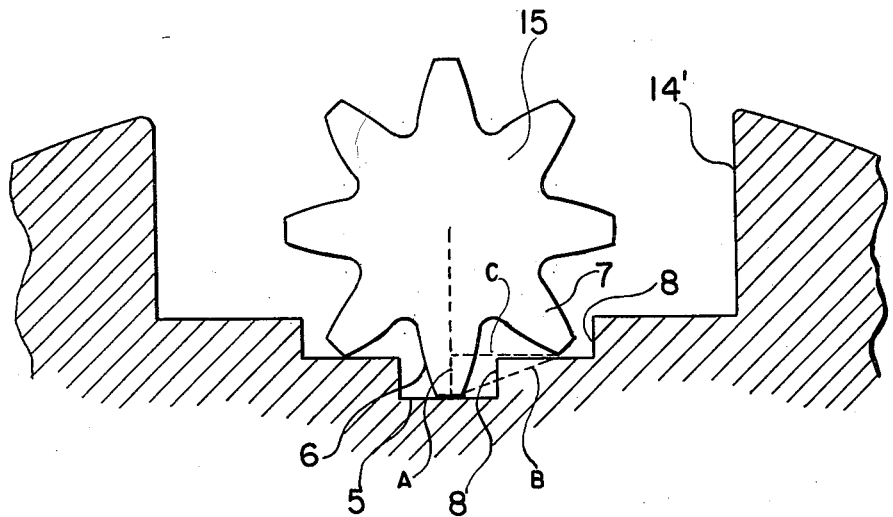
FIG. 14 is another diagrammatic view demonstrating the principle of the present invention.

It is one requirement of the present invention that the height and width of the steps of the terraced bottom of the recess be correlated to the diameter of the roller and to the number and shape of the teeth thereof. In other words, while the height of the risers is limited by the requirement that each successive tooth be able to ascend onto the next step and not be hindered in this movement by any further step or by the sidewall of the recess, the steps must be also of the proper width to give each successive tooth a foothold, preferably at the center of the step. The underlaying principle is shown in FIG. 14. The width of the common center groove 5 of the recess 14′ and of the individual steps is shown to be about equal to the length of the side C of the right-angle triangle, formed by the extremity A of a radius of the roller 15 terminating at the tip of tooth 6, a line B connecting the tip of tooth 6 with the tip of tooth 7, and the perpendicular C drawn from the tip of tooth 7 toward the extremity A of said radius. The maximum height of the risers 8 of the steps is determined by the length of the side A. Actually, these risers must be slightly shorter than A, in order to furnish the required clearance for the rotating teeth when the roller ascends or descends the steps. Although the width of the center groove and/or of the individual steps may be more or less, such disregard of the above-explained principle is possible only with a very small number of steps, whereby the lack of correlation between roller and terraced bottom does not affect the operation. An exception is the last step, which may be always wider or narrower than the other steps. In this case, the sidewall of recess 14′ forces the roller 15 into a position thrusting two or three adjacent teeth into the core, but at a lower depth.

Once these requirements have been met, there is considerable leeway, however, in the manner in which the rise of the toothed roller is produced and the herein-claimed device can be adapted for various requirements. If the risers are low, the ascent of the toothed roller is slow. If the risers are high, say as high as possible considering the afore-mentioned limitation, the ascent of the roller is relatively fast. If, as shown in FIG. 9, the height of the risers decreases from the center toward the edge of the recess 14a, the ascent of the roller is at a decelerating rate. The terracing of the recess 14b, shown in FIG. 10, produces a uniform, linear rise that remains constant regardless of whether high or low steps are used. FIG. 11 shows a recess 14c having a terracing which causes a low step start, with acceleration toward the end. It will be obvious that, while one type of the afore-described terracing may be situated at one side of the center groove of the recess, the steps ascending toward the other edge of the recess may be of a different type. As a result the chuck will act differently at the commencement of opposite operations.

While most of the material that is subjected to winding processes, and the commonly used cardboard cores require a uniform, linear rise of the roller and, as illustrated in FIG. 3, the clamping effect of only one or two of the teeth of the roller so that the bottom configuration of the recess 14 can be restricted to one or two raised steps at each side of the groove, very delicate, thin gauge or elastic materials require a slow, uniform rise, or a slow start with accelerated rise to reduce the starting shock load. Even some initial slippage is desirable in specific instances, which can be readily attained by causing a sufficiently slow rise of the toothed roller. Depending particularly upon the nature of the core material, a quick rise or fast start with decelerating rise is often advantageous to prevent furrowing of the core and damage thereto, particularly where the initial torque in winding or unwinding extremely tough and heavy material is very high.

The self-locking core chuck of the present invention can be utilized in conjunction with cardboard cores or cores made from various other fibrous or plastic materials, non-ferrous metals or mild steel. For metal cores, the roller teeth must have sharp edges and the rollers and chuck recesses must be hardened. The depth of bite into the core depends upon the density and hardness of the core material as well as upon the pull exerted upon the material that is unwound or the torsional thrust upon the core onto which the material is wound. While $\frac{3}{32}$ inch is the average depth of bite required in conjunction with a cardboard core, $\frac{1}{32}$ inch and less may suffice in case of a metal core. Rollers used in connection with metal cores preferably have an increased number of teeth and a very shallow step rise. Generally speaking, the only limiting factor as to the number of steps is the size of the chuck circumference.

While I have disclosed several embodiments of the present invention, it is to be understood that these embodiments are given by example only and not in a limiting sense, the scope of the present invention being determined by the objects and the claims.

I claim:

1. A core chuck designed to lock the core of a roll of material during winding and unwinding operations to a mandrel, said core chuck comprising a tubiform cylindrical chuck body dimensioned to accommodate a core, means for fastening said chuck body onto a mandrel shaft, said chuck body defining on the surface opposite said core a recess disposed parallel to the rotating axis thereof, said recess having a terraced bottom including at least one step ascending from a common center groove to each side of the recess, the faces of said step and of said common center groove being substantially parallel to and spaced apart at different distances from the opposite smooth face of said core, a toothed roller in said recess with its axis parallel to the axis of said chuck body, said roller having an over-all diameter slightly in excess of the greatest depth of said recess with one tooth resting on the bottom of said common center groove and an opposing tooth adapted to bite into the opposite face of said core to form a pivot point for a turning of said roller, and a tooth adjacent to said one tooth being adapted to mount the step adjacent said common center groove in response to a lateral force acting upon at least said opposing tooth of said roller, and spring means returning said roller into the lowermost position in said recess upon cessation of said lateral force.

2. The core chuck, as set forth in claim 1, wherein the front ends of said tubiform cylindrical body and of said toothed roller are reduced to truncated cones, a neck journal cut into said roller, a peripheral groove cut perpendicularly to the longitudinal axis of said chuck body into the surface of said chuck body, said spring means comprising a helical spring whose ends are fastened to said neck journal inserted in said peripheral groove, and face plates confining said toothed roller within said recess fastened to the front and rear end of said chuck body.

3. The core chuck, as set forth in claim 1, wherein said chuck body comprises a spider wheel including a hub and spider arms dimensioned to fit into said core, a head of substantially triangular cross-section mounted at the outer extremities of said spider arms, and said recess being cut into the peripheral surfaces of said head.

4. The core chuck, as set forth in claim 1, wherein one part of said chuck body is dimensioned to fit over a projecting end section of said core, and said recess is cut into the inner wall of said one part of said chuck body.

5. The core chuck, as set forth in claim 1, wherein said spring means comprises two leaf springs pressing from opposite directions against said toothed roller.

6. The core chuck, as set forth in claim 1, wherein said chuck body has a plurality of said recesses, diametrical borings which extend through said chuck body and said mandrel shaft and intercept said plurality of recesses, one of said toothed rollers being disposed in each of said recesses, said spring means comprising helical springs inserted into said borings and connected to opposed toothed rollers for returning the opposed rollers into their lowermost positions in their respective recesses upon cessation of said lateral force, and face plates in the shape of truncated cones fastened at both ends of said chuck body.

7. The core chuck, as set forth in claim 1, wherein said recess includes side walls and risers, as well as terrace-surfaces, said side walls and said risers being cut diametrically into said chuck body and said terrace-surfaces being concentric with the surface of said cylindrical chuck body.

8. The core chuck, as set forth in claim 1, wherein said recess comprises a plurality of uniform steps ascending from each side of said common center groove.

9. The core chuck, as set forth in claim 1, wherein said recess comprises a plurality of steps of increasing height ascending from each side of said common center groove.

10. The core chuck, as set forth in claim 1, wherein said recess comprises a plurality of steps of decreasing height ascending from each side of said common center groove.

References Cited in the file of this patent

UNITED STATES PATENTS

| 1,122,627 | Milne | Dec. 29, 1914 |
| 2,116,243 | Johnson | May 3, 1938 |
| 2,379,091 | LeTourneau | June 26, 1945 |
| 2,759,680 | Johnson | Aug. 21, 1956 |
| 2,798,678 | Dadd | July 9, 1957 |

FOREIGN PATENTS

| 516,937 | Germany | Jan. 28, 1931 |
| 386,435 | Great Britain | Jan. 19, 1933 |